(12) United States Patent
Anders

(10) Patent No.: US 11,843,240 B2
(45) Date of Patent: Dec. 12, 2023

(54) DEVICE AND PROCESS FOR FAULT DETECTION OF A POWER DEVICE

(71) Applicant: CREE, INC., Durham, NC (US)

(72) Inventor: Adam E. Anders, Cary, NC (US)

(73) Assignee: WOLFSPEED, INC., Durham, NC (US)

( * ) Notice: Subject to any disclaimer, the term of this patent is extended or adjusted under 35 U.S.C. 154(b) by 0 days.

(21) Appl. No.: 17/341,942

(22) Filed: Jun. 8, 2021

(65) Prior Publication Data
US 2022/0393460 A1   Dec. 8, 2022

(51) Int. Cl.
*H02H 7/08* (2006.01)
*H02H 7/125* (2006.01)
*H02H 7/09* (2006.01)

(52) U.S. Cl.
CPC ........ *H02H 7/1255* (2013.01); *H02H 7/0822* (2013.01); *H02H 7/09* (2013.01)

(58) Field of Classification Search
CPC ...... H02H 7/1255; H02H 7/0822; H02H 7/09; H01H 9/542; H01H 9/548; H01H 9/40; H01H 9/42; H01H 9/54; H01H 9/56; H01H 47/002; H01H 47/00; H01H 47/004; H01H 47/005; H01H 47/22; H01H 13/64; H01H 1/0015; H01H 1/18; H01H 1/2083; H01H 1/605; H01H 1/62; H01H 2009/544; H01H 2009/545; H01H 2009/546; H01H 47/02–22; H01H 50/04–12; H01H 50/546

See application file for complete search history.

(56) References Cited

U.S. PATENT DOCUMENTS

| | | | |
|---|---|---|---|
| 6,381,151 B1 * | 4/2002 | Jang | H02M 3/33523 363/21.01 |
| 7,205,756 B1 * | 4/2007 | Baker | G01R 29/16 361/78 |
| 2014/0334195 A1 * | 11/2014 | Nussbaum | H02M 3/3378 363/21.04 |
| 2015/0244164 A1 * | 8/2015 | Li | H03K 17/0822 361/87 |
| 2021/0351770 A1 * | 11/2021 | Liu | H03K 17/0822 |

* cited by examiner

*Primary Examiner* — Bryan R Perez
(74) *Attorney, Agent, or Firm* — BakerHostetler

(57) ABSTRACT

A power device fault detection circuit includes a first fault detector configured to measure an output signal of at least one power device and output a first fault signal when a voltage of the output signal of the at least one power device exceeds a first voltage reference level after a first time period; and a second fault detector configured to measure an output signal of the at least one power device and output a second fault signal when a voltage of the output signal of the at least one power device exceeds a second voltage reference level after a second time period, where the first time period implemented by the first fault detector is shorter than the second time period implemented by the second fault detector.

71 Claims, 9 Drawing Sheets

DEVICE AND PROCESS FOR FAULT DETECTION OF A POWER DEVICE

BACKGROUND OF THE DISCLOSURE

Various applications implement one or more power devices for controlling current, voltage, and/or power. During operation, the one or more power devices may experience an over-current, an overpower, an overvoltage, and/or like undesirable condition. Such a condition may damage the application, the one or more power devices, associated components, and/or the like.

To avoid the above-noted conditions, a fault detection device may be implemented. Typical fault detection devices work by comparing a sensed voltage to a threshold. When a power device is turned on, a transistor discharges a blanking capacitor (CBLK) and thereafter an internal or external current source is used to charge the CBLK. If the voltage on the CBLK exceeds a reference level, this is an indication that the voltage of the one or more power devices is over the threshold, and an over-current fault is triggered. Additionally, typical fault detection devices may include Leading Edge Blanking (LEB), which prevents the CBLK from charging for a certain period of time after a switching event to avoid false triggering a fault at a switching transition.

SUMMARY OF THE DISCLOSURE

One aspect includes a power device fault detection circuit, that includes a first fault detector configured to measure an output signal of at least one power device and output a first fault signal when a voltage of the output signal of the at least one power device exceeds a first voltage reference level after a first time period; and a second fault detector configured to measure an output signal of the at least one power device and output a second fault signal when a voltage of the output signal of the at least one power device exceeds a second voltage reference level after a second time period, where the first time period implemented by the first fault detector is shorter than the second time period implemented by the second fault detector.

One aspect includes a process of implementing a power device fault detection circuit, that includes generating with a first fault detector a first fault signal when a voltage of an output signal of at least one power device exceeds a first voltage reference level after a first time period; and generating with a second fault detector a second fault signal when a voltage of the output signal of the at least one power device exceeds a second voltage reference level after a second time period, where the first time period implemented by the first fault detector is shorter than the second time period implemented by the second fault detector.

One general aspect includes a power device fault detection circuit that includes a first fault detector having a first Leading Edge Blanking (LEB), a first measurement device, and a first filtering time function; the first fault detector configured to measure an output signal of at least one power device and output a first fault signal; a second fault detector includes a second Leading Edge Blanking (LEB), a second measurement device, and a second filtering time function; and the second fault detector configured to measure an output signal of the at least one power device and output a second fault signal.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
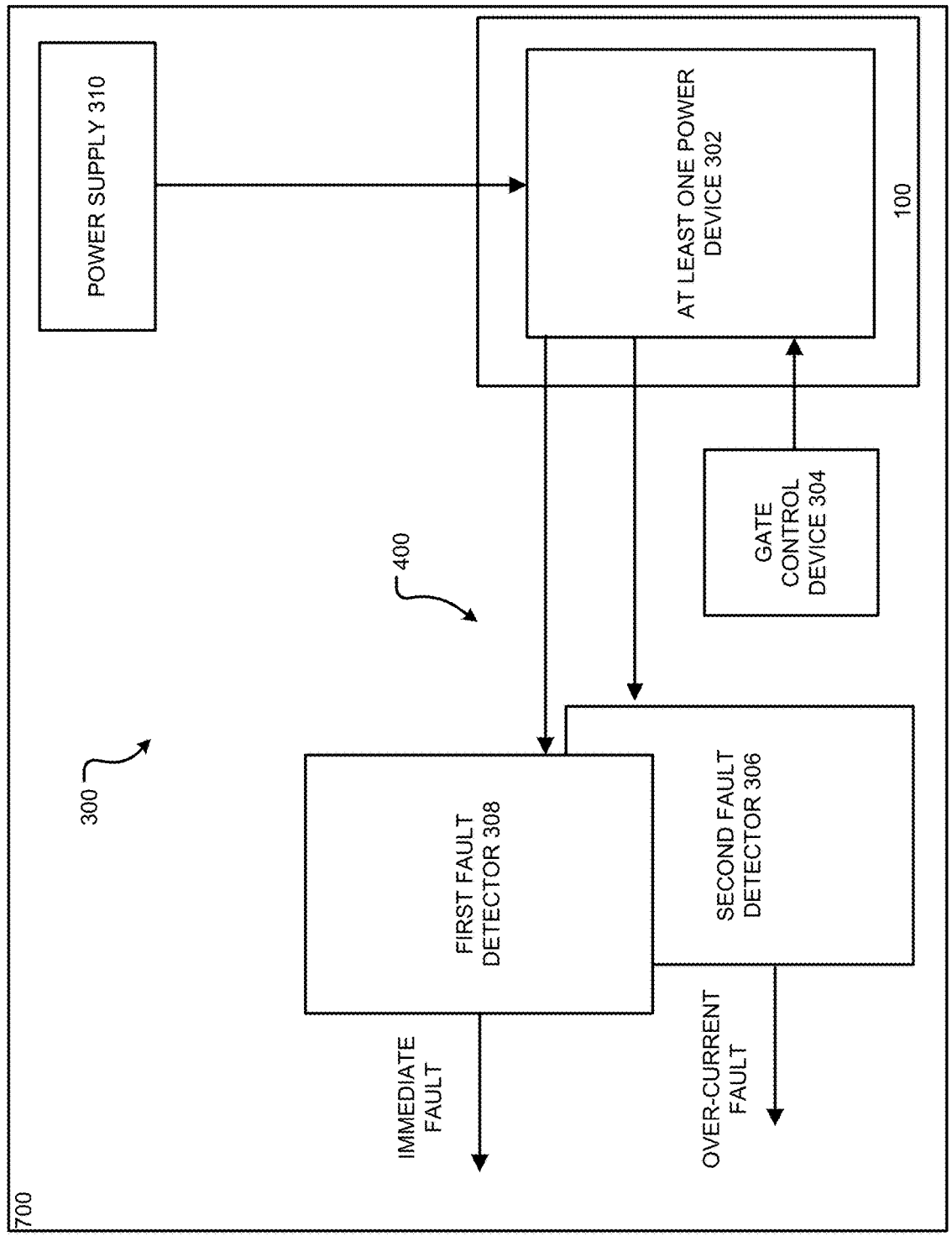
FIG. 1 schematically illustrates a system in accordance with the disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

Fault detection devices have a number of shortcomings. For example, some power devices, such as silicon carbide (SiC) metal—oxide—semiconductor field-effect transistors (MOSFETs) have a much shorter fault withstand time than the insulated-gate bipolar transistor (IGBT) devices, other transistors, and/or modules that these over-current circuits were traditionally intended and implemented for. Accordingly, a time to detection of a short is longer than desired. In particular, this results in longer trip times that mean higher fault current levels, which stresses the power devices, an associated printed circuit board (PCB), capacitors, and/or other components of a system.

The disclosed device and process for fault detection of a power device implements faster and/or more responsive fault detection and/or the like in order to reduce and/or limit stresses experienced by power devices and/or other components of a system.

The disclosed device and process for fault detection may include, may be configured for, may implement, and/or the like Leading Edge Blanking (LEB). In aspects, the disclosed device and process for fault detection may retain and/or implement a short leading edge blanking time to allow for a switching transition. For example, the disclosed device and process for fault detection may retain and/or implement a short leading edge blanking time of 60-120 ns (nanoseconds) to allow for a switching transition. Other blanking times are contemplated as well, and the blanking times may vary based on an application, the power device, and/or the like. The above-noted short leading edge blanking time is in contrast to applications that increase a leading edge blanking time to avoid nuisance trips. In aspects, the blanking time may be 40 ns-180 ns, 40 ns-60 ns, 60 ns-80 ns, 80 ns-100 ns, 100 ns-120 ns, 120 ns-140 ns, 140 ns-160 ns, or 160 ns-180 ns.

The disclosed device and process for fault detection may implement a blanking capacitor (CBLK) configured to avoid entering a charging state. In particular, the disclosed device and process for fault detection may implement a state, a circuit, a process, and/or the like that may implement a disconnection of the blanking capacitor (CBLK) from an over-current node or a portion of a blanking capacitance. For example, the blanking capacitor (CBLK) may include two or more separate capacitors, and the circuit may only disconnect some of the two or more separate capacitors to reduce the capacitance and/or charging time, but not eliminate it so as to maintain some noise immunity. Additionally, the disclosed device and process for fault detection may implement and/or may turn on a pull-up voltage, a current source, and/or the like to raise a voltage on the over-current node.

Thereafter, the disclosed device and process for fault detection may compare, or otherwise measure, a voltage on the over-current node to a higher reference level voltage and/or higher level threshold voltage than the typical reference level voltage during normal fault circuit operation. If the disclosed device and process for fault detection determines that the voltage on the over-current node remains above the threshold, the disclosed device and process for fault detection may indicate that the power device, such as a SiC MOSFET, is in an over-current state. For example, if the disclosed device and process for fault detection determines that the voltage on the over-current node is VDS>~12 V (voltage drain—source greater than approximately 12 volts) for certain applications, certain power devices, and/or the like, the disclosed device and process for fault detection may indicate that the power device is in an over-current state. Other voltages are contemplated as well, and the voltages may vary based on an application, the power device, and/or the like.

As an initial step, the disclosed device and process for fault detection may include a small filtering time requiring the over-current node voltage to remain above the higher reference level voltage and/or higher level threshold voltage during an entire de-glitching time, a predetermined portion of the de-glitching time, and/or the like. For example, the disclosed device and process for fault detection may include a small filtering time requiring the over-current node voltage to remain above the higher reference level voltage and/or higher level threshold voltage during the entire de-glitching time of ~50 ns for certain applications, certain power devices, and/or the like. Other de-glitching times are contemplated as well, and the de-glitching time may vary based on an application, the power device, and/or the like.

The disclosed device and process for fault detection may be further configured to determine whether the voltage on the over-current node is below the higher reference level voltage and/or higher level threshold voltage in the initial step. Thereafter, the disclosed device and process for fault detection may reconnect the CBLK to the circuit, and continue with the over-current circuit operation.

The disclosed device and process for fault detection may include and/or may be implemented in conjunction with a power device. The term 'power device' may refer to various forms of transistors and/or diodes designed for high voltages and currents. The transistors may be controllable switches allowing for unidirectional or bidirectional current flow (depending on device type) while the diodes may allow for current flow in one direction and may not be controllable. The transistor types may include but are not limited to a MOSFET, a SiC MOSFET, a Junction Field Effect Transistor (JFET), a Bipolar Junction Transistor (BJT), an Insulated Gate Bipolar Transistor (IGBT), and/or the like.

The power devices may include Wide Band Gap (WBG) semiconductors, including Gallium Nitride (GaN), Silicon Carbide (SiC), and/or the like. Nevertheless, various aspects of the disclosure may utilize any type of power device including Si type power devices and achieve a number of the benefits described herein.

The disclosed device and process for fault detection may include and/or may be implemented in conjunction with an application, a power module, and/or the like that may configured, structured, and/or optimized for one or more power devices that may include state-of-the-art wide band gap power semiconductor devices such as Gallium Nitride (GaN), Silicon Carbide (SiC), and the like, which are capable of carrying high amounts of currents and voltages and switching at increasingly faster speeds in comparison with established technologies.

FIG. 1 schematically illustrates a system in accordance with the disclosure.

In particular, FIG. 1 illustrates a system 300 that may include at least one power device 302, a gate control device 304, a first fault detector 308, a second fault detector 306, and a power supply 310. The first fault detector 308 may be configured as part of a fault detector device 400. The fault detector device 400 may further include the second fault detector 306. The fault detector device 400 may further include any one or more other components as described herein.

The first fault detector 308 may be configured to compare, or otherwise measure, an output signal of the at least one power device 302 to a first voltage reference level and/or first voltage threshold level and may output a fault signal, a first fault signal, an immediate fault signal, a rapid fault signal and/or the like (hereinafter an immediate fault signal) when the output signal of the at least one power device 302 exceeds the first voltage reference level. Moreover, the first fault detector 308 may be configured to compare an output signal of the at least one power device 302 after a first time period to reduce inadvertent operation. The first fault detector 308 may be configured as a short-circuit detector, an over-current detector, an immediate fault detector, and/or the like and hereinafter may be referred to as the first fault detector 308 for brevity of disclosure.

The second fault detector 306 may be configured to compare, or otherwise measure, an output signal of the at least one power device 302 to a second voltage reference level and may output a fault signal, a second fault signal, an over-current fault signal, and/or the like (hereinafter over-current fault signal) when the output signal of the at least one power device 302 exceeds the second voltage reference level and/or second voltage threshold level. Moreover, the second fault detector 306 may be configured to compare an output signal of the at least one power device 302 after a second time period to reduce inadvertent operation. The second fault detector 306 may be configured as a short-circuit detector, an over-current detector, and/or the like and hereinafter may be referred to as the second fault detector 306 for brevity of disclosure.

In various aspects, the first voltage reference level implemented by the first fault detector 308 may be higher than the second voltage reference level implemented by the second fault detector 306.

In various aspects, the first time period implemented by the first fault detector 308 may be shorter than the second time period implemented by the second fault detector 306.

In various aspects, the first voltage reference level implemented by the first fault detector 308 may be higher than the second voltage reference level implemented by the second fault detector 306; and the first time period implemented by the first fault detector 308 may be shorter than the second time period implemented by the second fault detector 306.

In particular, an immediate fault may be detected by the first fault detector 308 in response to an over-current, an overpower, an overvoltage, and/or like undesirable condition when the output signal of the at least one power device 302 exceeds the first voltage reference level after the first time period.

On the other hand, an over-current fault may be detected by the second fault detector 306 in response to an over-current, an overpower, an overvoltage, and/or like undesirable condition when the output signal of the at least one power device 302 exceeds the second voltage reference level after the second time period.

Accordingly, as further described herein, the first fault detector 308 and the second fault detector 306 may operate differently and provide different levels of protection to the at least one power device 302, the system 300, an application 700, and/or associated components. In particular, the first fault detector 308 may be configured to provide an immediate fault signal more quickly than an over-current fault of the second fault detector 306. In other words, the first fault detector 308 may be more responsive, quicker, and/or the like in comparison to the second fault detector 306. More specifically, the first fault detector 308 may be configured with the shorter first time period in conjunction with the higher first voltage reference level to provide an immediate fault signal more quickly than an over-current fault of the second fault detector 306. In other words, the first fault detector 308 may be configured to operate to generate an immediate fault signal based on the shorter first time period and the first higher reference voltage level; and the second fault detector 306 may be configured to operate to generate an over-current fault signal based on the longer second time period and the second lower voltage level reference. Additionally, the first fault detector 308 may implement the first higher reference voltage level to reduce inadvertent operation in order to implement the shorter first time period and thus provide a more accurate determination of an immediate fault more quickly.

The at least one power device 302 may be controlled to alternatingly conduct and block current supplied by the power supply 310. In particular, the at least one power device 302 may be controlled by a drive signal from the gate control device 304. The at least one power device 302 may include a plurality of power devices in series and/or in parallel. The at least one power device 302 may be a MOSFET, a SiC MOSFET, a Junction Field Effect Transistor (JFET), and a Bipolar Junction Transistor (BJT). In one aspect, the at least one power device 302 may be a SiC MOSFET.

The system 300 may use various topologies to connect to the power supply 310 with DC link capacitors as an intermediate connection between them. The DC link capacitors may act to filter ripple and counter effects of inductance in a current path. However, the system 300 may be implemented without the DC link capacitors.

In one aspect, the first fault detector 308 and/or the second fault detector 306 may be inserted into the application 700, implemented with the application 700, configured with the application 700, and/or the like. The application 700 may be a system implementing the first fault detector 308 and/or the second fault detector 306. In one aspect, the system 300 and/or the fault detector device 400 may be inserted into the application 700, implemented with the application 700, configured with the application 700, and/or the like. The application 700 may be a system implementing the system 300 and/or the fault detector device 400. The system 300 may be a system implementing the application 700 and/or the fault detector device 400.

The application 700 may be a power system, a motor system, an automotive motor system, a charging system, an automotive charging system, a vehicle system, an industrial motor drive, an embedded motor drive, an uninterruptible power supply, an AC-DC power supply, a welder power supply, military systems, an inverter, an inverter for wind turbines, solar power panels, tidal power plants, and electric vehicles (EVs), a converter, and/or the like. In one aspect, the system 300 and/or the fault detector device 400, which may include the second fault detector 306 and/or the first fault detector 308, may be inserted into a power module 100, implemented with the power module 100, configured with the power module 100, or the like. The power module 100 may include one or more of a base plate, at least one power substrate, a first terminal, a second terminal, a third terminal, one or more switch positions, the at least one power device 302, signal terminals, and/or the like. Moreover, it is contemplated that the power module 100 may include more, fewer, or different elements than those described herein.

Figure 2:
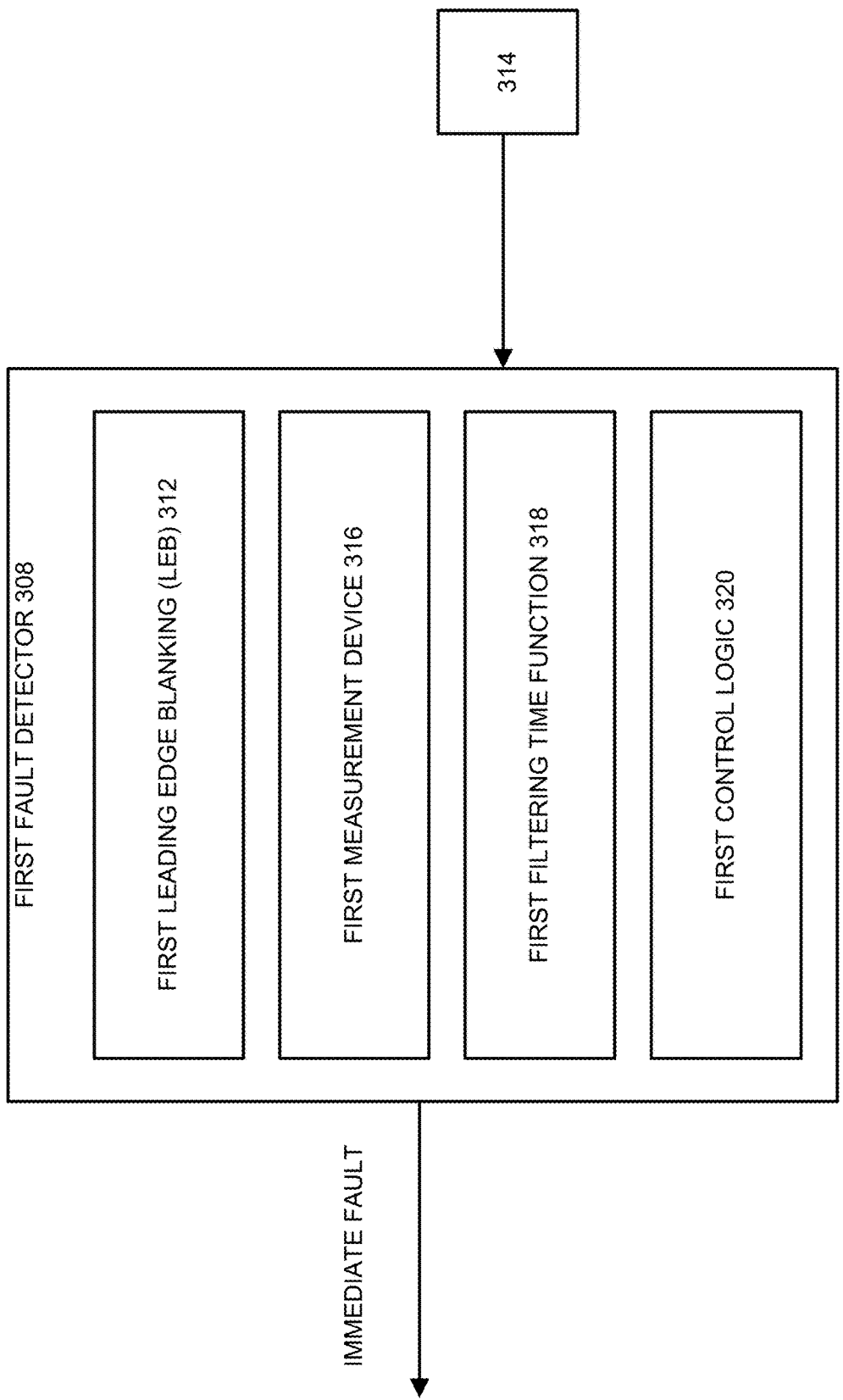
FIG. 2 schematically illustrates a first fault detector according to the disclosure.

FIG. 2 schematically illustrates a first fault detector according to the disclosure.

In particular, FIG. 2 illustrates that the first fault detector 308 may include, may be configured for, may implement, and/or the like a first control logic 320. The first control logic 320 may implement, control, respond, and/or the like to one or more of a first Leading Edge Blanking (LEB) 312, a first measurement device 316, a first filtering time function 318, and/or the like. The first control logic 320 may receive additional switching and control information from a microcontroller (not shown), another processor (not shown), and/or the like.

Additionally, FIG. 2 illustrates that the first fault detector 308 may include, may be configured for, may implement, and/or the like the first Leading Edge Blanking (LEB) 312.

In aspects, the first Leading Edge Blanking (LEB) 312 may implement at least in part the first time period of the first fault detector 308. In aspects, the first Leading Edge Blanking (LEB) 312 may implement at least in part the first time period as a leading edge blanking time of 40 ns-180 ns, 40 ns-60 ns, 60 ns-80 ns, 80 ns-100 ns, 100 ns-120 ns, 120 ns-140 ns, 140 ns-160 ns, or 160 ns-180 ns.

In aspects, the first fault detector 308 may retain and/or implement a short leading edge blanking time to allow for a switching transition of the at least one power device 302. For example, the first fault detector 308 may retain and/or implement a short leading edge blanking time of 60-120 ns to allow for a switching transition. Other blanking times are contemplated as well, and the blanking times may vary based on the system 300, the application 700 implementing the system 300, the at least one power device 302, and/or the like. The above-noted short leading edge blanking time is in contrast to applications that increase the blanking time to avoid nuisance trips.

In particular aspects, the first Leading Edge Blanking (LEB) 312 may receive as input a signal from the at least one power device 302 and may provide an output to the first fault detector 308. In aspects, the first Leading Edge Blanking (LEB) 312 may provide a signal to the first fault detector 308 that enables the first fault detector 308 to begin monitoring the at least one power device 302 and/or the system 300 for an immediate fault. While the first Leading Edge Blanking (LEB) 312 is active, the first fault detector 308 may be blind to the occurrence of an immediate fault event. By delaying activation of the first fault detector 308, the first Leading Edge Blanking (LEB) 312 may prevent a false detection of an immediate fault.

After operation of the first Leading Edge Blanking (LEB) 312, the first fault detector 308 may be active and may compare a voltage from the at least one power device 302, such as a voltage on an over-current node 314, to a reference level voltage. In one aspect, the first fault detector 308 may be active and may compare a voltage from the at least one power device 302, such as a voltage on an over-current node 314, to a higher reference level voltage and/or higher level threshold voltage than the reference level voltage of the second fault detector 306.

In particular aspects, the first measurement device 316 may be implemented by logic, may be implemented by circuit, may be implemented by the first control logic 320 and/or the like. In particular, the first fault detector 308 may implement the first measurement device 316 configured as a comparator to compare a voltage from the at least one power device 302, such as a voltage on the over-current node 314, to a higher reference level voltage and/or higher level threshold voltage. In aspects, the first fault detector 308 may implement the first measurement device 316 configured as a comparator to compare a voltage from the at least one power device 302, such as a voltage on the over-current node 314, to a higher reference level voltage and/or higher level threshold voltage which is greater than the reference level voltage of the second fault detector 306. In aspects, the first measurement device 316 may utilize other voltage measurement technology to determine a voltage from the at least one power device 302, such as a voltage on the over-current node 314.

In particular aspects, the first filtering time function 318 may be implemented by logic, may be implemented by circuit, may be implemented by the first control logic 320 and/or the like. In particular, the first fault detector 308 may include the first filtering time function 318 that may be implemented and/or configured to require a voltage from the at least one power device 302, such as the over-current node 314 voltage, to remain above the threshold during an entire de-glitching time, a predetermined portion of the de-glitching time, and/or the like.

In various aspects, the first fault detector 308 may operate, configure, and/or implement the first filtering time function 318 to require a voltage from the at least one power device 302, such as the over-current node 314 voltage, to remain above the threshold during the de-glitching time of 30 ns-80 ns, 30 ns-40 ns, 40 ns-50 ns, 50 ns-60 ns, 60 ns-70 ns, or 70 ns-80 ns for certain applications, certain power devices, and/or the like.

In various aspects, the first fault detector 308 may operate, configure, and/or implement the first filtering time function 318 to require a voltage from the at least one power device 302, such as the over-current node 314 voltage, to remain above the threshold during the de-glitching time of at least 30 ns, 40 ns, 50 ns, 60 ns, or 70 ns for certain applications, certain power devices, and/or the like. In various aspects, the first fault detector 308 may operate, configure, and/or implement the first filtering time function 318 to require a voltage from the at least one power device 302, such as the over-current node 314 voltage, to remain above the threshold during the de-glitching time of less than 40 ns, 50 ns, 60 ns, 70 ns, or 80 ns for certain applications, certain power devices, and/or the like. For example, the first fault detector 308 may include the first filtering time function 318 that may be implemented and/or configured to require a voltage from the at least one power device 302, such as the over-current node 314 voltage, to remain above the threshold during the entire de-glitching time of ~50 ns for certain applications, certain power devices, and/or the like.

If the first fault detector 308 determines that a voltage from the at least one power device 302, such as the voltage on the over-current node 314, remains above the threshold, the first fault detector 308 may indicate that the at least one power device 302 is in an over-current state. In one aspect, the first fault detector 308 may determine that a voltage from the at least one power device 302, such as the voltage on the over-current node 314, detected by the first measurement device 316 is VDS greater than 8 V, 10 V, 12 V, 14 V, 16 V, or 18 V, and thereafter the first fault detector 308 may indicate an immediate fault in which the at least one power device 302 is in an over-current state. Based on the indication of an immediate fault by the first fault detector 308, the system 300 and/or the fault detector device 400 may take action to address the over-current state of the at least one power device 302. For example, the system 300 and/or the fault detector device 400 may turn off the at least one power device 302.

Figure 3:
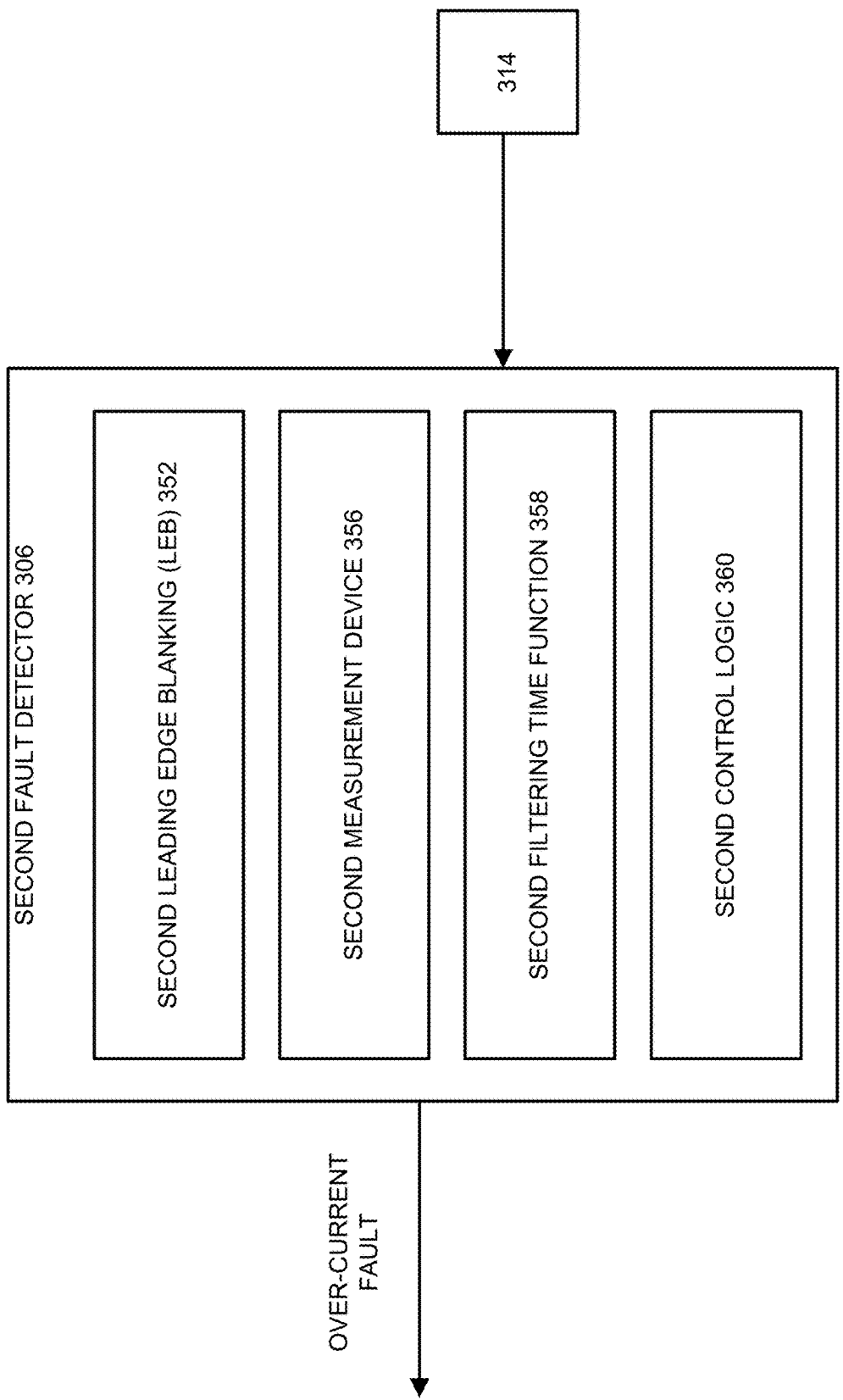
FIG. 3 schematically illustrates a second fault detector according to the disclosure.

FIG. 3 schematically illustrates a second fault detector according to the disclosure.

In particular, FIG. 3 illustrates that the second fault detector 306 may include, may be configured for, may implement, and/or the like a second control logic 360. The second control logic 360 may implement, control, respond, and/or the like to one or more of a second Leading Edge Blanking (LEB) 352, a second measurement device 356, a second filtering time function 358, and/or the like. The second control logic 360 may receive additional switching and control information from a microcontroller (not shown), another processor (not shown), and/or the like.

Additionally, FIG. 3 illustrates that the second fault detector 306 may include, may be configured for, may implement, and/or the like the second Leading Edge Blanking (LEB) 352. In aspects, the second Leading Edge Blanking (LEB) 352 may implement at least in part the second time period of the second fault detector 306. In aspects, the second Leading Edge Blanking (LEB) 352 may implement at least in part the second time period that is greater than the first time period of the first fault detector 308.

In particular aspects, the second Leading Edge Blanking (LEB) 352 may be implemented by logic, may be implemented by circuit, may be implemented by the second control logic 360 and/or the like. The second Leading Edge Blanking (LEB) 352 may receive as input a signal from the at least one power device 302 and may provide an output to the second fault detector 306. In aspects, the second Leading Edge Blanking (LEB) 352 may provide a signal to the second fault detector 306 that enables the second fault detector 306 to begin monitoring the at least one power device 302 and/or the system 300 for an over-current fault. While the second Leading Edge Blanking (LEB) 352 is active, the second fault detector 306 may be blind to the occurrence of an over-current fault event. By delaying activation of the second fault detector 306, the second Leading Edge Blanking (LEB) 352 may prevent a false detection of an over-current fault.

After operation of the second Leading Edge Blanking (LEB) 352, the second fault detector 306 may be active and may compare a voltage from the at least one power device 302, such as a voltage on an over-current node 314, to a reference level voltage. In one aspect, the second fault detector 306 may be active and may compare a voltage from the at least one power device 302, such as a voltage on an over-current node 314, to a lower reference level voltage than the reference level voltage of the first fault detector 308.

In particular aspects, the second measurement device 356 may be implemented by logic, may be implemented by circuit, may be implemented by the second control logic 360 and/or the like. In particular, the second fault detector 306 may implement the second measurement device 356 configured as a comparator to compare a voltage from the at least one power device 302, such as a voltage on the over-current node 314, to a lower reference level voltage than the reference level voltage of the first fault detector 308. In other aspects, the second measurement device 356 may utilize other voltage measurement technology.

In particular aspects, the second filtering time function 358 may be implemented by logic, may be implemented by circuit, may be implemented by the second control logic 360 and/or the like. In particular, the second fault detector 306 may include the second filtering time function 358 that may be implemented and/or configured to require a voltage from the at least one power device 302, such as the over-current node 314 voltage, to remain above the threshold during an entire de-glitching time, a predetermined portion of the de-glitching time, and/or the like.

If the second fault detector 306 determines that a voltage from the at least one power device 302, such as the voltage on the over-current node 314, remains above the threshold, the second fault detector 306 may indicate that the at least one power device 302 is in an over-current state and may indicate an over-current fault in which the at least one power device 302 is in an over-current state. Based on the indication of an over-current fault by the second fault detector 306, the system 300 and/or the fault detector device 400 may take action to address the over-current state of the at least one power device 302. For example, the system 300 and/or the fault detector device 400 may turn off the at least one power device 302.

In aspects, the system 300 and/or the fault detector device 400 may implement the first fault detector 308 prior to implementing the second fault detector 306. In aspects, the system 300 and/or the fault detector device 400 may implement the first fault detector 308 while the second fault detector 306 is disabled. In aspects, the system 300 and/or the fault detector device 400 may disable the second fault detector 306 while implementing the first fault detector 308. Thereafter, the system 300 and/or the fault detector device 400 may enable and implement the first fault detector 308. In aspects, the system 300 and/or the fault detector device 400 may implement the first fault detector 308 the second fault detector 306 simultaneously.

Figure 4:
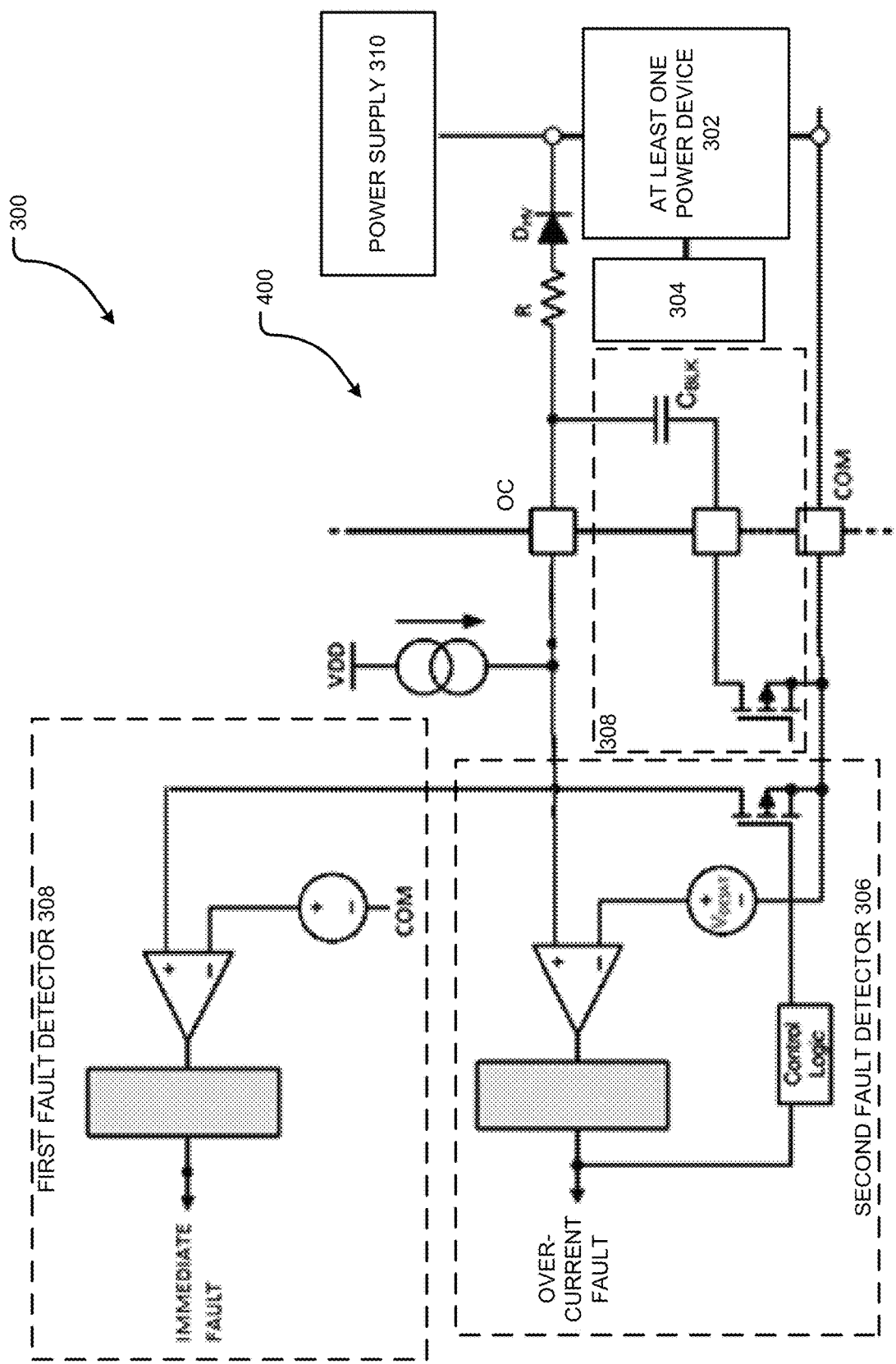
FIG. 4 schematically illustrates an exemplary implementation of the system in accordance with FIG. 1.

FIG. 4 schematically illustrates an exemplary implementation of the system in accordance with FIG. 1.

Figure 5:
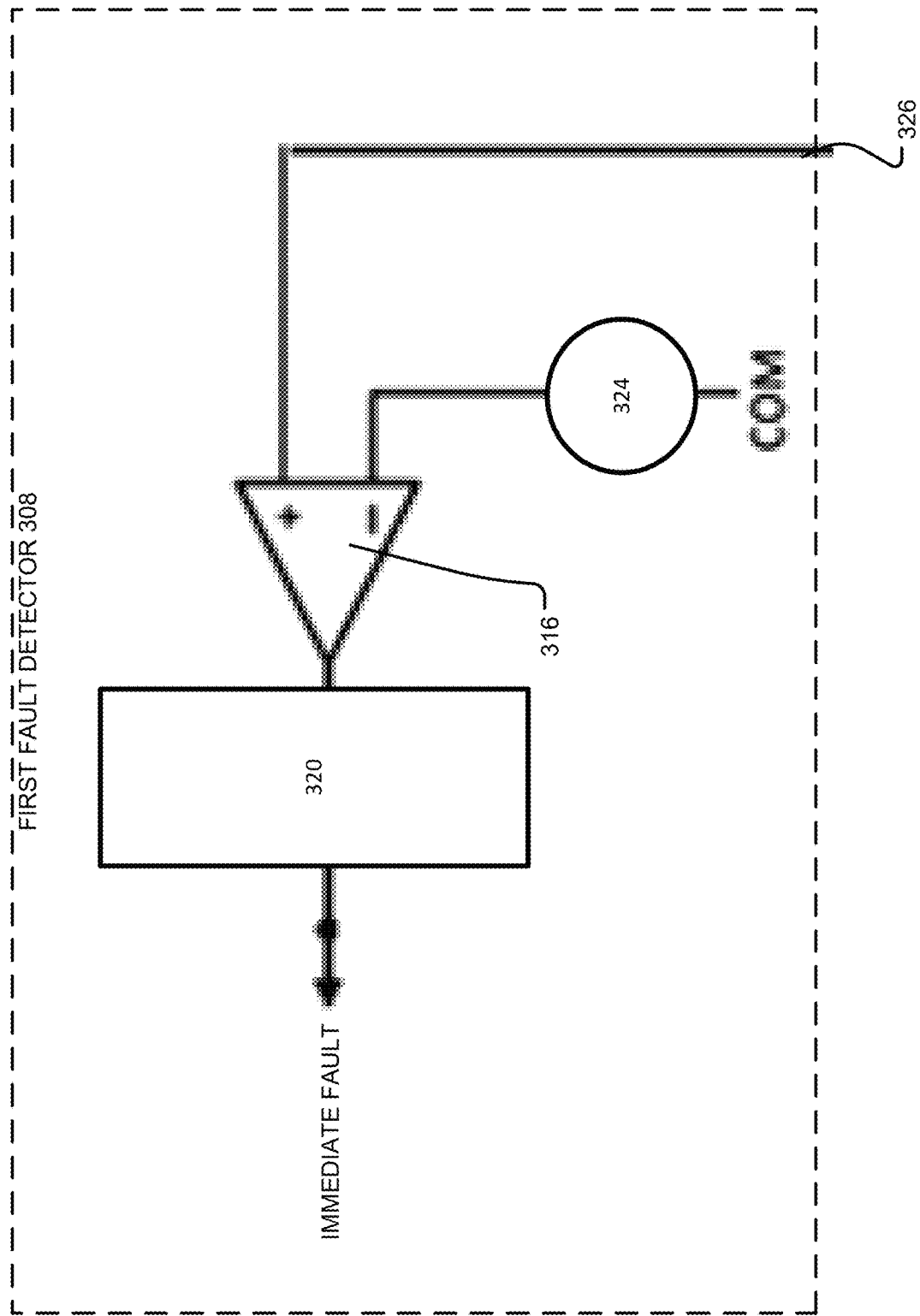
FIG. 5 schematically illustrates a part of the exemplary implementation of the system in accordance with FIG. 4.

FIG. 5 schematically illustrates a part of the exemplary implementation of the system in accordance with FIG. 4.

Figure 6:
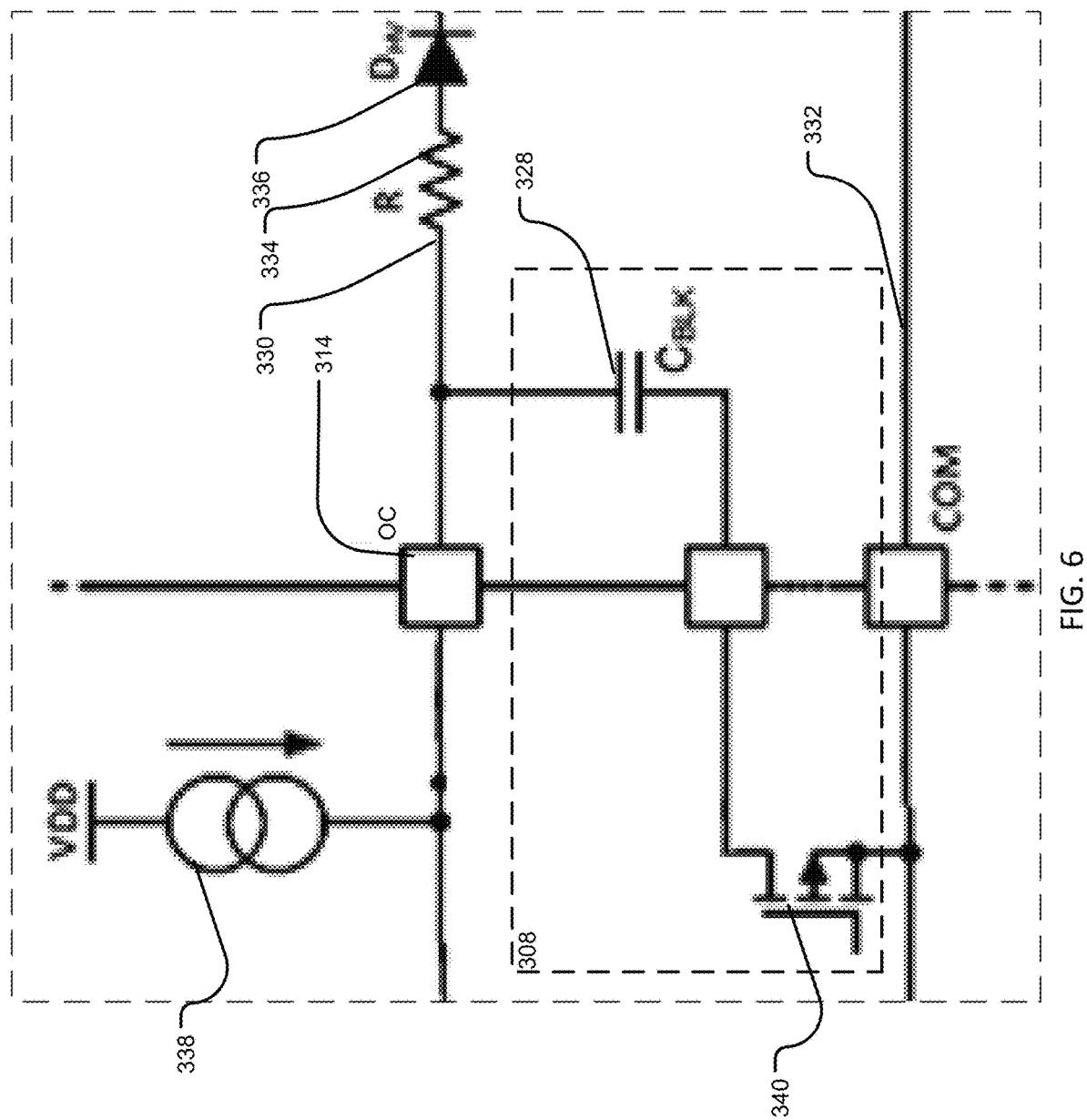
FIG. 6 schematically illustrates another part of the exemplary implementation of the system in accordance with FIG. 4.

FIG. 6 schematically illustrates another part of the exemplary implementation of the system in accordance with FIG. 4.

In particular, FIG. 4 illustrates an exemplary implementation of the system 300, the second fault detector 306, and the first fault detector 308. With reference to FIG. 5 and FIG. 6, partial details of an exemplary implementation of the first fault detector 308 are illustrated. In particular, FIG. 5 illustrates the first control logic 320, the first measurement device 316, and a first level voltage reference 324.

In particular aspects, the first fault detector 308 may implement the first measurement device 316 configured to compare a voltage from the at least one power device 302, such as a voltage on the over-current node 314 (received on line 326), to the first level voltage reference 324, which may be higher than the reference level voltage of the second fault detector 306.

If the first fault detector 308 determines that a voltage from the at least one power device 302, such as the voltage on the over-current node 314, remains above the threshold, the first fault detector 308 may indicate that the at least one power device 302 is in an over-current state and may indicate an immediate fault in which the at least one power device 302 is in an over-current state.

With reference to FIG. 6, the fault detector device 400 and/or the first fault detector 308 may implement a blanking capacitor (CBLK) 328. In particular, the fault detector device 400 and/or the first fault detector 308 may implement the blanking capacitor (CBLK) 328 configured to avoid entering a charging state. More specifically, the first fault detector 308 may implement a state, a circuit, a process, and/or the like that may implement a disconnection of the blanking capacitor (CBLK) 328 from the over-current node 314, the first fault detector 308, the fault detector device 400, and/or the like.

In particular aspects, the blanking capacitor (CBLK) 328 may be connected to a line 330 extending between the at least one power device 302 and the over-current node 314. In particular, the line 330 may be connected to the at least one power device 302 and the power supply 310. The line 330 may further include a resistor 334 and diode 336 in series prior to a junction connecting the line 330 to the at least one power device 302 and the power supply 310. In this regard, the resistor 334 and the diode 336 may be connected to the at least one power device 302 and may clamp a voltage at the over-current node 314 to a voltage of the at least one power device 302.

Additionally, the blanking capacitor (CBLK) 328 or a portion of a blanking capacitance may be connected to a transistor 340 and a line 332. The line 332 may be connected to the at least one power device 302 and the second fault detector 306. The fault detector device 400, the first fault detector 308, and/or the first control logic 320 may control the transistor 340 such that the blanking capacitor (CBLK) 328 or a portion of a blanking capacitance is disconnected from the line 332 so as to avoid and/or prevent the blanking capacitor (CBLK) 328 entering a charging state. Additionally, the fault detector device 400 the first fault detector 308, and/or the first control logic 320 may implement and/or may turn on a pull-up voltage 338, a current source, and/or the like to raise a voltage on the over-current node 314.

The first fault detector 308 may be further configured to determine whether a voltage from the at least one power device 302, such as the voltage on the over-current node 314, is below the threshold as previously described. Thereafter, the first fault detector 308 and/or the first control logic 320 may operate the transistor 340 to reconnect the blanking capacitor (CBLK) 328 to the circuit of the fault detector device 400 and in particular the line 332. Thereafter, the first fault detector 308, the second fault detector 306, and/or the fault detector device 400 may continue with an over-current circuit operation. In particular, the system 300 and/or the fault detector device 400 may continue operation with the second fault detector 306.

Figure 7:
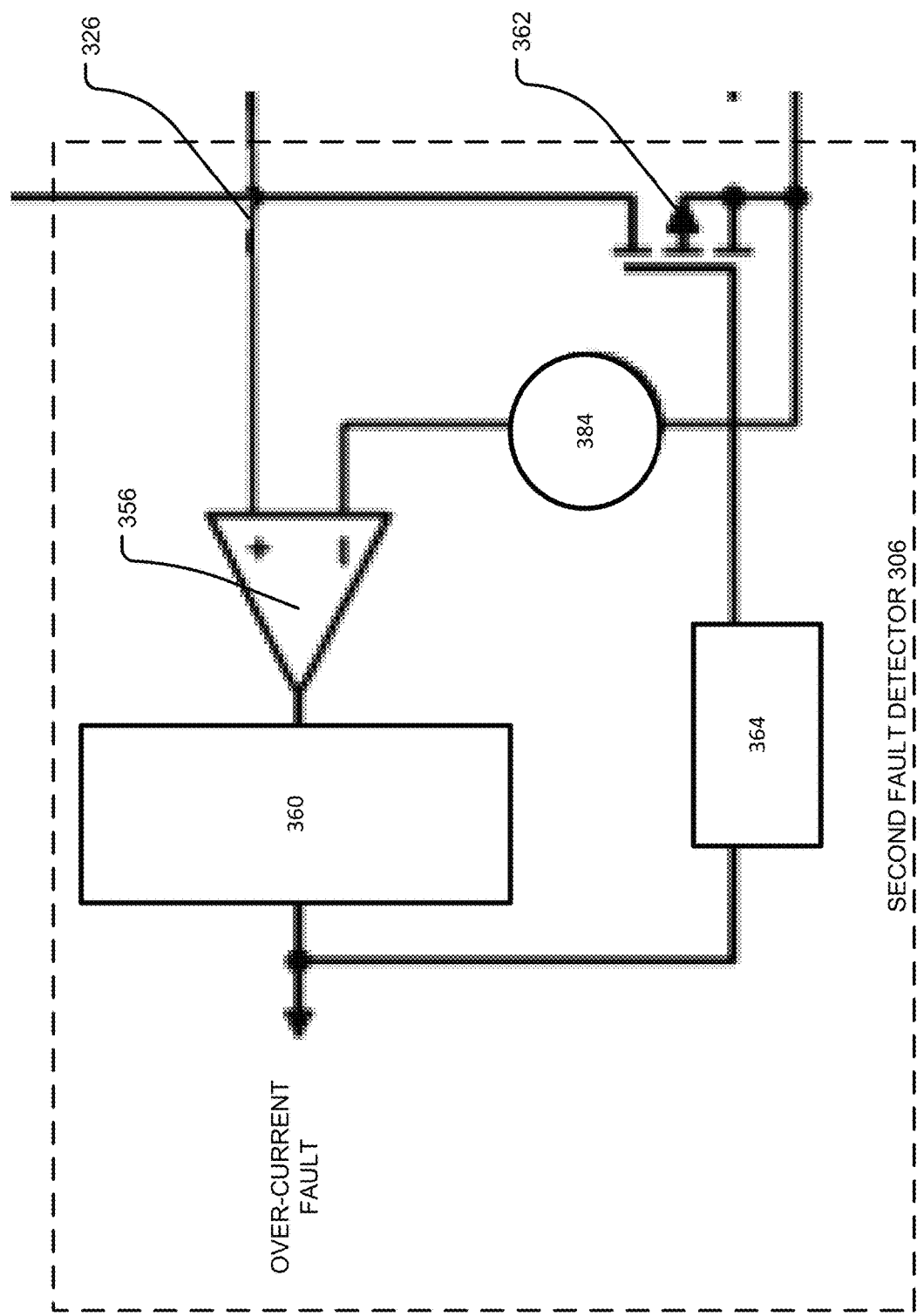
FIG. 7 schematically illustrates another part of the exemplary implementation of the system in accordance with FIG. 4.

FIG. 7 schematically illustrates another part of the exemplary implementation of the system in accordance with FIG. 4.

In particular, FIG. 7 illustrates an exemplary implementation of the second fault detector 306. More specifically, FIG. 7 illustrates that the second fault detector 306 may include one or more the second control logic 360, the second measurement device 356, a second level voltage reference 384, a control transistor 362, and a secondary logic 364.

In particular aspects, the second fault detector 306 may implement the second measurement device 356 that may be configured to compare a voltage from the at least one power device 302, such as a voltage on the over-current node 314 (received on line 326), to the second level voltage reference 384, which may be lower than the first level voltage reference 324 of the first fault detector 308.

If the second fault detector 306 determines that a voltage from the at least one power device 302, such as the voltage on the over-current node 314, remains above the threshold, the second fault detector 306 may indicate that the at least one power device 302 is in an over-current state and may indicate an over-current fault in which the at least one power device 302 is in an over-current state.

Figure 8:
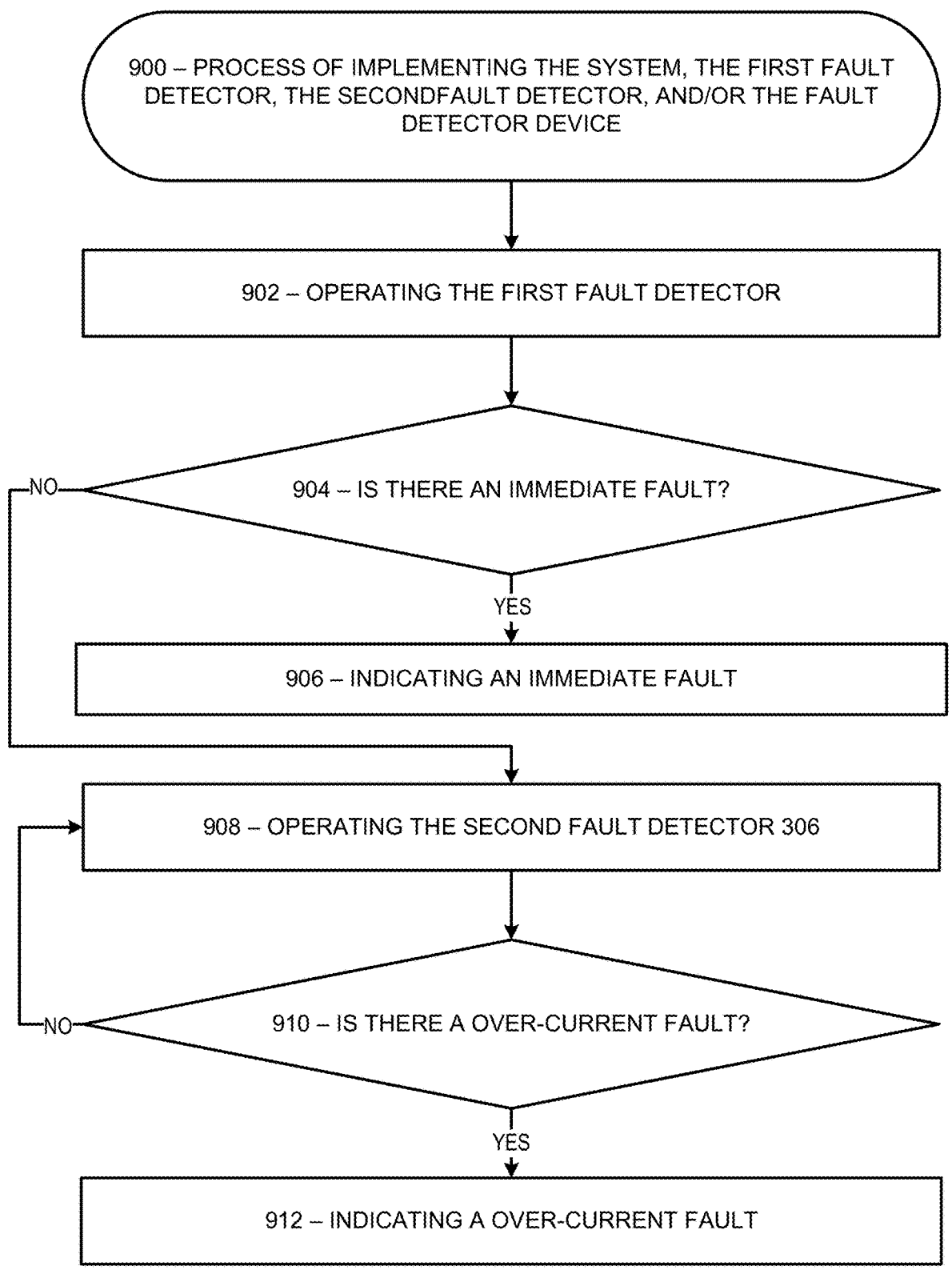
FIG. 8 illustrates a process of implementing the system.

FIG. 8 illustrates a process of implementing the system.

In particular, FIG. 8 illustrates a process of implementing the system 300, the first fault detector 308, the second fault detector 306, and/or the fault detector device 400 (box 900). In particular, each of the features of the system 300, the first fault detector 308, the second fault detector 306, and/or the fault detector device 400 as described herein may form part of the process of implementing the system 300, the first fault detector 308, the second fault detector 306, and/or the fault detector device 400 (box 900). It should be noted that the aspects of process of implementing the system 300, the first fault detector 308, the second fault detector 306, and/or the fault detector device 400 (box 900) may be performed in a different order consistent with the aspects described herein. Moreover, the process of implementing the system 300, the first fault detector 308, the second fault detector 306, and/or the fault detector device 400 (box 900) may be modified to have more or fewer processes consistent with the various aspects disclosed herein.

The process of implementing the system 300, the first fault detector 308, the second fault detector 306, and/or the fault detector device 400 (box 900) may include operating the first fault detector 308 (box 902). In particular, operating the first fault detector 308 (box 902) may include any aspects of implementation of the first fault detector 308 as described herein.

In some aspects, the fault detector device 400, the first fault detector 308, and/or the first control logic 320 may control the transistor 340 such that the blanking capacitor (CBLK) 328 is disconnected from the line 332 so as to avoid and/or prevent the blanking capacitor (CBLK) 328 entering a charging state. Additionally, the fault detector device 400 the first fault detector 308, and/or the first control logic 320 may implement and/or may turn on a pull-up voltage 338, a current source, and/or the like to raise a voltage on the over-current node 314.

Additionally, operating the first fault detector 308 (box 902) may include implementing the first Leading Edge Blanking (LEB) 312, which may implement at least in part the first time period of the first fault detector 308. After operation of the first Leading Edge Blanking (LEB) 312, the first measurement device 316 may compare a voltage from the at least one power device 302, such as a voltage on the over-current node 314, to a higher reference level voltage and/or higher level threshold voltage and the first filtering time function 318 may require a voltage from the at least one power device 302, such as the over-current node 314 voltage, to remain above the threshold during an entire de-glitching time, a predetermined portion of the de-glitching time, and/or the like.

The process of implementing the system 300, the first fault detector 308, the second fault detector 306, and/or the fault detector device 400 (box 900) may include determining whether there is an immediate fault (box 904). If the first fault detector 308 determines that a voltage from the at least one power device 302, such as the voltage on the over-current node 314, remains above the threshold, the first fault detector 308 may determine that the at least one power device 302 is in an over-current state in the process may advance to box 906.

On the other hand, if the first fault detector 308 determines that a voltage from the at least one power device 302, such as the voltage on the over-current node 314, remains above the threshold, the first fault detector 308 may determine that the at least one power device 302 is not in an over-current state and the process may advance to box 906. Thereafter, the first fault detector 308 and/or the first control logic 320 may operate the transistor 340 to reconnect the blanking capacitor (CBLK) 328 to the circuit of the fault detector device 400 and in particular the line 332.

The process of implementing the system 300, the first fault detector 308, the second fault detector 306, and/or the fault detector device 400 (box 900) may include indicating an immediate fault (box 906). In particular, the first fault detector 308 may indicate an immediate fault in which the at least one power device 302 is in an over-current state. Based on the indication of an immediate fault by the first fault detector 308, the system 300 and/or the fault detector device 400 may take action to address the over-current state of the at least one power device 302. For example, the system 300 and/or the fault detector device 400 may turn off the at least one power device 302.

The process of implementing the system 300, the first fault detector 308, the second fault detector 306, and/or the fault detector device 400 (box 900) may include operating the second fault detector 306 (box 908). In particular, the second fault detector 306 may implement the second Leading Edge Blanking (LEB) 352, which may implement at least in part the second time period that is greater than the first time period of the first fault detector 308. After operation of the second Leading Edge Blanking (LEB) 352, the second fault detector 306 may be active and may compare a voltage from the at least one power device 302, such as a voltage on an over-current node 314, to a lower reference level voltage than the reference level voltage of the first fault detector 308. Additionally, the second fault detector 306 may include the second filtering time function 358 that may be implemented and/or configured to require a voltage from the at least one power device 302, such as the over-current node 314 voltage, to remain above the threshold during an entire de-glitching time, a predetermined portion of the de-glitching time, and/or the like. If the second fault detector 306 determines that a voltage from the at least one power device 302, such as the voltage on the over-current node 314, remains above the threshold, the second fault detector 306 may determine that the at least one power device 302 is in an over-current state.

The process of implementing the system 300, the first fault detector 308, the second fault detector 306, and/or the fault detector device 400 (box 900) may include determining if there is an over-current fault (box 910). When the second fault detector 306 determines that a voltage from the at least one power device 302, such as the voltage on the over-current node 314, remains above the threshold, the second fault detector 306 may determine that the at least one power device 302 is in an over-current state.

The process of implementing the system 300, the first fault detector 308, the second fault detector 306, and/or the fault detector device 400 (box 900) may include indicating an over-current fault (box 912) when the second fault detector 306 determines that a voltage from the at least one power device 302, such as the voltage on the over-current node 314, remains above the threshold, that the at least one power device 302 is in an over-current state. Based on the indication of an over-current fault by the second fault detector 306, the system 300 and/or the fault detector device 400 may take action to address the over-current state of the at least one power device 302. For example, the system 300 and/or the fault detector device 400 may turn off the at least one power device 302.

Figure 9:
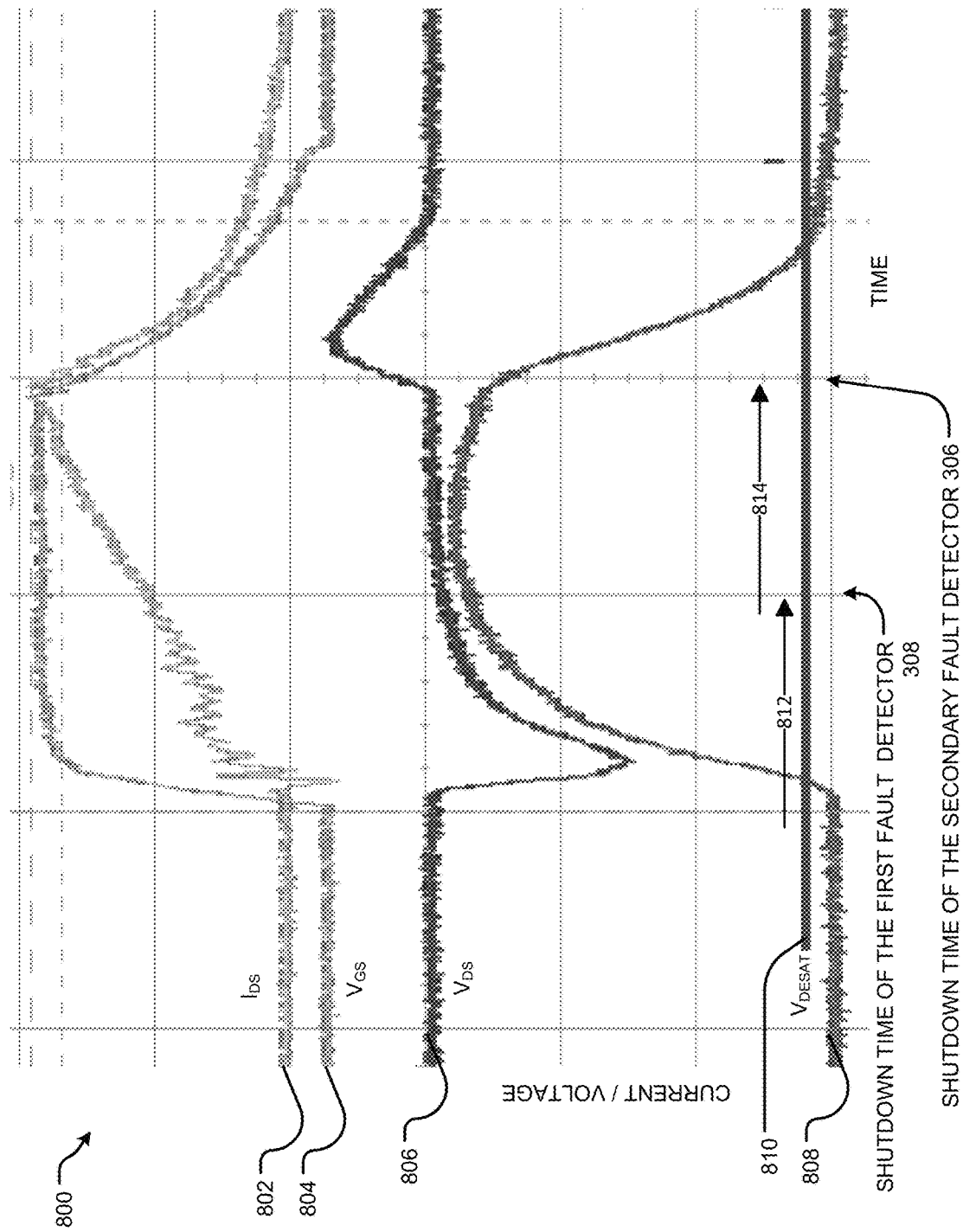
FIG. 9 illustrates a graph of voltage and current versus time for implementation of the system according to aspects of the disclosure.

FIG. 9 illustrates a graph of voltage and current versus time for implementation of the system according to aspects of the disclosure.

In particular, FIG. 9 illustrates a graph 800 of voltage and current versus time with a vertical axis having units of voltage and current and a horizontal axis of time for the at least one power device 302 of the system 300. Additionally, the graph 800 illustrates waveforms of a voltage at the over-current node of the gate 802. This waveform shows a traditional method where the voltage on the over-current node charges with a constant current until a trip point where it starts to discharge. The graph 800 further illustrates waveforms of a gate—source voltage (VGS) 804, a drain—source voltage (VDS) 806, and a source current 808 for the at least one power device 302 of the system 300.

With further reference to FIG. 9, the graph 800 further illustrates a threshold level 810 that a VDS of the at least one power device 302 would fall below during normal operation to prevent a trip. For example, the threshold level 810 may prevent the voltage at the over-current node of the gate 802 from charging up to a trip level. As illustrated in the graph 800, the VDS never falls that low because the at least one power device 302 is in an over-current condition. Accordingly, the disclosed device and process may utilize use a higher trip level and/or higher voltage to detect the over-current condition more quickly since the VDS does not get close to the threshold level 810. Additionally, the graph 800 illustrates the shutdown time of the first fault detector 308, and the shutdown time of the second fault detector 306.

In particular, operation of the first fault detector 308 is indicated by arrow 812 and operation of the second fault detector 306 is indicated by arrow 814. More specifically, as described herein, the first fault detector 308 implementing the first measurement device 316, the first filtering time function 318, and/or the like provides an immediate fault indication more quickly as indicated by the arrow 812. On the other hand, as described herein the second fault detector 306 implementing the second measurement device 356, the second filtering time function 358, and/or the like provides an over-current fault subsequent to any immediate fault indication as indicated by the arrow 814.

Accordingly, the system 300 and/or the fault detector device 400 may implement a device and process for fault detection by implementation of the first fault detector 308 implementing faster and/or more responsive fault detection and/or the like of the at least one power device 302 in order to reduce and/or limit stresses experienced by the at least one power device 302, the system 300, the application 700, and/or other components of a system. Moreover, the system 300 and/or the fault detector device 400 may implement a device and process for fault detection by implementation of the second fault detector 306 implementing additional fault detection and/or the like of the at least one power device 302 in order to reduce and/or limit stresses experienced by the at least one power device 302, the system 300, the application 700, and/or other components of a system.

In various aspects, the system 300, which may include the second fault detector 306, the first fault detector 308, and/or the fault detector device 400, may be implemented as a 3-phase inverter. In aspects, the inverter may be configured as two separate 3-phase inverters, one 3-phase inverter, one full-bridge, one half-bridge, and/or the like. In one aspect, the inverter may be configured with six dedicated half bridges. In one aspect, the above-noted configurations may be structured and arranged with connections outside of the inverter. Two half-bridges in parallel may form a full-bridge, while three in parallel may form a three-phase topology. The three-phase topology is also often referred to as a six pack, signifying the six switch positions among the three phase legs. Moreover, other topologies are contemplated for the power module including common source, common drain, neutral point clamp, and/or the like. In particular, the system 300 may be implemented in numerous topologies including a half-bridge configuration, a full-bridge configuration, a common source configuration, a common drain configuration, a neutral point clamp configuration, and a three-phase configuration. Applications of the system 300 include motor drives, solar inverters, circuit breakers, protection circuits, DC—DC converters, and the like.

The application 700 may be a power system, a motor system, a motor drive, an automotive motor system, a charging system, an automotive charging system, a vehicle system, an industrial motor drive, an embedded motor drive, an uninterruptible power supply, an AC-DC power supply, a welder power supply, a military system, an inverter, an inverter for wind turbines, solar power panels, tidal power plants, electric vehicles (EVs), a converter, a solar inverter, a circuit breaker, a protection circuit, a DC—DC converter, an Off-Board DC Fast Charger for an electric vehicle (EV), an on-board DC/DC Converter for an electric vehicle (EV), an on-board battery charger for an electric vehicle (EV), an electric vehicle (EV) Powertrain/Main Inverter, an electric vehicle (EV) charging infrastructure, an electric traction motor, a motor drive for an electric motor, a commercial inductive heating system, an uninterruptible power system, and/or the like.

The system 300, the application 700, and/or the power module 100, which may include the second fault detector 306, the first fault detector 308, and/or the fault detector device 400, may connect to, may include, and/or the like a power system, a motor system, a motor drive, an automotive motor system, a charging system, an automotive charging system, a vehicle system, an industrial motor drive, an embedded motor drive, an uninterruptible power supply, an AC-DC power supply, a welder power supply, military systems, an inverter, an inverter for wind turbines, solar power panels, tidal power plants, electric vehicles (EVs), a converter, solar inverters, circuit breakers, protection circuits, DC—DC converters, Off-Board DC Fast Chargers for electric vehicles (EVs) and the like, on-board DC/DC Converters for electric vehicles (EVs) and the like, on-board battery chargers for electric vehicles (EVs) and the like, electric vehicle (EV) Powertrains/Main Inverters, electric vehicle (EV) charging infrastructures, electric traction motors, motor drives for electric motors, commercial inductive heating systems, uninterruptible power systems, and/or the like.

For example, the system 300, the application 700, and/or the power module 100, which may include the second fault detector 306, the first fault detector 308, and/or the fault detector device 400, may be implemented in electric vehicles (EVs) as an on-board DC/DC Converter which may be utilized for powering by diverse voltages—propulsion, HVAC, window lifts, lighting inside and out, infotainment, seat belt sensors, and/or the like. The on-board DC/DC Converter may convert and portion out a correct voltage to each in real time, enabling all systems to work as one.

As another example, the system 300, the application 700, and/or the power module 100, which may include the second fault detector 306, the first fault detector 308, and/or the fault detector device 400, may be implemented in electric vehicles (EVs) as an Off-Board DC Fast Charger. The off-board charger may convert incoming external alternating current (AC) to the direct current (DC) power mode required by the EV ecosystem and store it in a battery.

As another example, the system 300, the application 700, and/or the power module 100, which may include the second fault detector 306, the first fault detector 308, and/or the fault detector device 400, may be implemented in electric vehicles (EVs) as an On-Board Battery Charger that may convert DC power from the electric vehicle (EV) battery subsystem into AC power for the main drive motor of the electric vehicles (EVs). When the electric vehicles (EVs) is receiving external power from the grid, the device's rectifier circuitry may convert AC power into DC power to recharge the battery of the electric vehicles (EVs). The system may also harvest kinetic energy created by the momentum of the electric vehicle (EV) through regenerative braking and sends that to the battery as well.

As another example, the system 300, the application 700, and/or the power module 100, which may include the second fault detector 306, the first fault detector 308, and/or the fault detector device 400, may be implemented in electric vehicles (EVs) as an electric vehicle (EV) Powertrain/Main Inverter. In this regard, the electric vehicle (EV) powertrain may propel the electric vehicle (EV) in conjunction with the EV Powertrain/Main Inverter.

As another example, the system 300, the application 700, and/or the power module 100, which may include the second fault detector 306, the first fault detector 308, and/or the fault detector device 400, may be implemented in electric vehicle (EV) Charging Infrastructure for electric vehicle (EV) charging stations to deliver more power with lower losses.

As another example, the system 300, the application 700, and/or the power module 100, which may include the second fault detector 306, the first fault detector 308, and/or the fault detector device 400, may be implemented in an electric traction motor implemented in electric vehicles (EVs), locomotives, roller coasters, other types of transportation, and/or the like that may be configured to control by switching electrical current frequency and voltage and through manipulation of magnetic fields. Such systems may be smaller and lighter than existing systems.

As another example, the system 300, the application 700, and/or the power module 100, which may include the second fault detector 306, the first fault detector 308, and/or the fault detector device 400, may be implemented in a Motor Drive for Electric motors various transportation systems, factory robots, and the like that may achieve reduction in energy costs, run faster and cooler, and use less energy.

As another example, the system 300, the application 700, and/or the power module 100, which may include the second fault detector 306, the first fault detector 308, and/or the fault detector device 400, may be implemented in a commercial Inductive Heating system providing the ability to liquify metal, grow semiconductor crystals, ionize plasma, and/or the like by delivering extremely high current and high frequency power switched at exceptionally fast speeds with low conduction loss.

As another example, the system 300, the application 700, and/or the power module 100, which may include the second fault detector 306, the first fault detector 308, and/or the fault detector device 400, may be implemented in Uninterruptible Power Systems providing a reliable backup power source for any electronic system including standby battery backup power delivery, redundant, double-conversion UPS technologies, and the like that may allow zero transfer time, fewer switching losses, lower system costs, lower operating temperature, and/or the like.

Aspects of the disclosure have been described above with reference to the accompanying drawings, in which aspects of the disclosure are shown. It will be appreciated, however, that this disclosure may, however, be embodied in many different forms and should not be construed as limited to the aspects set forth above. Rather, these aspects are provided so that this disclosure will be thorough and complete, and will fully convey the scope of the disclosure to those skilled in the art. Additionally, the various aspects described may be implemented separately. Moreover, one or more the various aspects described may be combined. Like numbers refer to like elements throughout.

It will be understood that, although the terms first, second, etc. are used throughout this specification to describe various elements, these elements should not be limited by these terms. These terms are only used to distinguish one element from another. For example, a first element could be termed a second element, and, similarly, a second element could be termed a first element, without departing from the scope of the disclosure. The term "and/or" includes any and all combinations of one or more of the associated listed items.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "top" or "bottom" may be used herein to describe a relationship of one element, layer or region to another element, layer or region as illustrated in the figures. It will be understood that these terms are intended to encompass different orientations of the device in addition to the orientation depicted in the figures.

Aspects of the disclosure are described herein with reference to cross-section illustrations that are schematic illustrations of idealized embodiments (and intermediate structures) of the disclosure. The thickness of layers and regions in the drawings may be exaggerated for clarity. Additionally, variations from the shapes of the illustrations as a result, for example, of manufacturing techniques and/or tolerances, are to be expected.

In the drawings and specification, there have been disclosed typical aspects of the disclosure and, although specific terms are employed, they are used in a generic and descriptive sense only and not for purposes of limitation, the scope of the disclosure being set forth in the following claims.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure. In this regard, the various aspects, features, components, elements, modules, arrangements, circuits, and the like are contemplated to be interchangeable, mixed, matched, combined, and the like. In this regard, the different features of the disclosure are modular and can be mixed and matched with each other.

What is claimed is:

1. A power device fault detection circuit, comprising:
a first fault detector configured to measure an output signal of at least one power device and output a first fault signal when a voltage of the output signal of the at least one power device exceeds a first voltage reference level after a first time period;
the first fault detector comprising a first Leading Edge Blanking (LEB) configured to implement at least in part the first time period and thereafter enable the first fault detector;
a second fault detector configured to measure the output signal of the at least one power device and output a second fault signal when a voltage of the output signal of the at least one power device exceeds a second voltage reference level after a second time period; and
the second fault detector comprising a second Leading Edge Blanking (LEB) configured to implement at least in part the second time period and thereafter enable the second fault detector,
wherein the first time period implemented by the first fault detector is shorter than the second time period implemented by the second fault detector.

2. The power device fault detection circuit according to claim 1 wherein the first fault detector is configured to be operational prior to the second fault detector being operational.

3. The power device fault detection circuit according to claim 1 wherein the first voltage reference level implemented by the first fault detector is higher than the second voltage reference level implemented by the second fault detector.

4. The power device fault detection circuit according to claim 1 wherein the first fault detector comprises:
a first measurement device, and
a first filtering time function configured to ensure the voltage of the output signal of the at least one power device exceeds the first voltage reference level during a de-glitching time.

5. The power device fault detection circuit according to claim 4 wherein the first measurement device is configured to determine whether the output signal of the at least one power device is greater than the first voltage reference level implemented by the first fault detector.

6. The power device fault detection circuit according to claim 4 wherein the first measurement device is configured as a comparator configured to compare the output signal of the at least one power device and the first voltage reference level implemented by the first fault detector.

7. The power device fault detection circuit according to claim 4 wherein the first Leading Edge Blanking (LEB) is configured to implement at least in part the first time period of the first fault detector.

8. The power device fault detection circuit according to claim 4 wherein the first measurement device is configured to measure a voltage of the output signal of the at least one power device.

9. The power device fault detection circuit according to claim 4 wherein the first fault detector comprises the first filtering time function that is configured to require the output signal of the at least one power device to remain above the first voltage reference level during a first de-glitching time.

10. The power device fault detection circuit according to claim 1 wherein the second fault detector comprises:
a second measurement device, and
a second filtering time function configured to ensure the voltage of the output signal of the at least one power device exceeds the second voltage reference level during a de-glitching time.

11. The power device fault detection circuit according to claim 10 wherein the second measurement device is configured measure a voltage of the output signal of the at least one power device.

12. The power device fault detection circuit according to claim 10 wherein the second measurement device is configured as a comparator configured to compare the output signal of the at least one power device and the second voltage reference level implemented by the second fault detector.

13. The power device fault detection circuit according to claim 10 wherein the second measurement device is configured to determine whether the output signal of the at least one power device is greater than the second voltage reference level implemented by the second fault detector.

14. The power device fault detection circuit according to claim 10 wherein the second fault detector comprises the second Leading Edge Blanking (LEB) configured to implement at least in part the second time period of the second fault detector.

15. The power device fault detection circuit according to claim 10 wherein the second fault detector comprises the second filtering time function configured to require the output signal of the at least one power device to remain above the second voltage reference level during a second de-glitching time to determine a second fault.

16. The power device fault detection circuit according to claim 1 wherein the first fault detector is configured to implement in part a blanking capacitor (CBLK).

17. The power device fault detection circuit according to claim 16 further comprising a transistor to disconnect the blanking capacitor (CBLK).

18. The power device fault detection circuit according to claim 16 wherein the first fault detector is further configured to determine whether a voltage on the output signal of the at least one power device is below the first voltage reference level and thereafter reconnect the blanking capacitor (CBLK).

19. The power device fault detection circuit according to claim 16 wherein the first fault detector is configured to implement the blanking capacitor (CBLK) to avoid entering a charging state.

20. The power device fault detection circuit according to claim 1 wherein the at least one power device comprises a SiC MOSFET.

21. A system comprising the power device fault detection circuit according to claim 1, the system configured as one of the following: an inverter, a power system, a motor system, a converter, and an AC-DC power supply.

22. A system comprising the power device fault detection circuit according to claim 1, and the system further comprising a plurality of the at least one power device arranged in a power module.

23. The power device fault detection circuit according to claim 1 wherein the first fault detector is configured to be operational while the second fault detector is disabled.

24. The power device fault detection circuit according to claim 1 wherein the at least one power device comprises at least one of the following: a metal-oxide-semiconductor field-effect transistor (MOSFET), a silicon carbide (SiC) MOSFET, a Junction Field Effect Transistor (JFET), and a Bipolar Junction Transistor (BJT).

25. A process of implementing a power device fault detection circuit, comprising:
    implementing a first Leading Edge Blanking (LEB) configured to provide at least in part a first time period and thereafter enable a first fault detector;
    generating with the first fault detector a first fault signal when a voltage of an output signal of at least one power device exceeds a first voltage reference level after the first time period;
    implementing a second Leading Edge Blanking (LEB) configured to provide at least in part a second time period and thereafter enable a second fault detector; and
    generating with the second fault detector a second fault signal when a voltage of the output signal of the at least one power device exceeds a second voltage reference level after the second time period,
    wherein the first time period implemented by the first fault detector is shorter than the second time period implemented by the second fault detector.

26. The process of implementing a power device fault detection circuit according to claim 25 further comprising:
    operating the first fault detector prior to operating the second fault detector;
    configuring a first filtering time function to ensure the voltage of the output signal of the at least one power device exceeds the first voltage reference level during a de-glitching time; and
    configuring a second filtering time function configured to ensure the voltage of the output signal of the at least one power device exceeds the second voltage reference level during a de-glitching time.

27. The process of implementing a power device fault detection circuit according to claim 25 further comprising configuring the first fault detector to be operational while disabling the second fault detector.

28. The process of implementing a power device fault detection circuit according to claim 25 wherein the first voltage reference level implemented by the first fault detector is higher than the second voltage reference level implemented by the second fault detector.

29. A process of implementing a system comprising the process of implementing a power device fault detection circuit according to claim 25, the process of implementing a system further comprising implementing the system as one of the following: an inverter, a power system, a motor system, a converter, and an AC-DC power supply.

30. The process of implementing a power device fault detection circuit according to claim 25 wherein the first fault detector comprises at least one of the following: a first Leading Edge Blanking (LEB), a first measurement device, and a first filtering time function.

31. The process of implementing a power device fault detection circuit according to claim 30 wherein the first Leading Edge Blanking (LEB) is configured to implement at least in part the first time period of the first fault detector.

32. The process of implementing a power device fault detection circuit according to claim 30 wherein the first measurement device is configured to determine whether a voltage of the output signal of the at least one power device is greater than the first voltage reference level implemented by the first fault detector.

33. The process of implementing a power device fault detection circuit according to claim 30 wherein the first measurement device is configured as a comparator configured to compare a voltage of the output signal of the at least one power device and the first voltage reference level implemented by the first fault detector.

34. The process of implementing a power device fault detection circuit according to claim 30 wherein the first measurement device is configured to measure a voltage of the output signal of the at least one power device.

35. The process of implementing a power device fault detection circuit according to claim 30 wherein the first fault detector comprises the first filtering time function that is configured to require the output signal of the at least one power device to remain above the first voltage reference level during a first de-glitching time.

36. The process of implementing a power device fault detection circuit according to claim 25 wherein the second fault detector comprises at least one of the following: a second Leading Edge Blanking (LEB), a second measurement device, and a second filtering time function.

37. The process of implementing a power device fault detection circuit according to claim 36 wherein the second measurement device is configured as a comparator configured to compare the output signal of the at least one power device and the second voltage reference level implemented by the second fault detector.

38. The process of implementing a power device fault detection circuit according to claim 36 wherein the second measurement device is configured to measure a voltage of the output signal of the at least one power device and the second voltage reference level implemented by the second fault detector.

39. The process of implementing a power device fault detection circuit according to claim 36 wherein the second measurement device is configured to determine whether a voltage of the output signal of the at least one power device is greater than the second voltage reference level implemented by the second fault detector.

40. The process of implementing a power device fault detection circuit according to claim 36 wherein the second fault detector comprises the second Leading Edge Blanking (LEB) configured to implement at least in part the second time period of the second fault detector.

41. The process of implementing a power device fault detection circuit according to claim 36 wherein the second fault detector comprises the second filtering time function configured to require the output signal of the at least one power device to remain above the second voltage reference level during a second de-glitching time to determine a second fault.

42. The process of implementing a power device fault detection circuit according to claim 25 wherein the first fault detector is configured to implement in part a blanking capacitor (CBLK).

43. The process of implementing a power device fault detection circuit according to claim 42 wherein the first fault detector is configured to implement the blanking capacitor (CBLK) to avoid entering a charging state.

44. The process of implementing a power device fault detection circuit according to claim 42 further comprising a transistor to disconnect the blanking capacitor (CBLK).

45. The process of implementing a power device fault detection circuit according to claim 42 wherein the first fault detector is further configured to determine whether a voltage on the output signal of the at least one power device is below the first voltage reference level and thereafter reconnect the blanking capacitor (CBLK).

46. The process of implementing a power device fault detection circuit according to claim 25 wherein the at least one power device comprises at least one of the following: a metal-oxide-semiconductor field-effect transistor (MOSFET), a silicon carbide (SiC) MOSFET, a Junction Field Effect Transistor (JFET), and a Bipolar Junction Transistor (BJT).

47. The process of implementing a power device fault detection circuit according to claim 25 wherein the at least one power device comprises a SiC MOSFET.

48. A process of implementing a system comprising the process of implementing a power device fault detection circuit according to claim 25, the process of implementing a system further comprising implementing the system comprising implementing a plurality of the at least one power device arranged in a power module.

49. A power device fault detection circuit, comprising:
a first fault detector comprising a first Leading Edge Blanking (LEB), a first measurement device, and a first filtering time function;
the first Leading Edge Blanking (LEB) is configured to implement at least in part a first time period and thereafter enable the first fault detector;
the first fault detector configured to measure an output signal of at least one power device and output a first fault signal;
a second fault detector comprising a second Leading Edge Blanking (LEB), a second measurement device, and a second filtering time function;
the second Leading Edge Blanking (LEB) is configured to implement at least in part a second time period and thereafter enable the second fault detector; and
the second fault detector configured to measure the output signal of the at least one power device and output a second fault signal, wherein:
the first fault detector is configured to measure the output signal of at least one power device and output the first fault signal when a voltage of the output signal of the at least one power device exceeds a first voltage reference level; and
the second fault detector is configured to measure the output signal of the at least one power device and output the second fault signal when a voltage of the output signal of the at least one power device exceeds a second voltage reference level.

50. The power device fault detection circuit according to claim 49 wherein the first fault detector is configured to be operational prior to the second fault detector being operational.

51. The power device fault detection circuit according to claim 49 wherein the first fault detector is configured to be operational while the second fault detector is disabled.

52. The power device fault detection circuit according to claim 49 wherein:
the first fault detector is configured to measure the output signal of at least one power device and output the first fault signal when the voltage of the output signal of the at least one power device exceeds the first voltage reference level after the first time period; and
the second fault detector is configured to measure the output signal of the at least one power device and output the second fault signal when the voltage of the output signal of the at least one power device exceeds the second voltage reference level after the second time period,
wherein the first time period implemented by the first fault detector is shorter than the second time period implemented by the second fault detector.

53. The power device fault detection circuit according to claim 52 wherein the first voltage reference level implemented by the first fault detector is higher than the second voltage reference level implemented by the second fault detector.

54. The power device fault detection circuit according to claim 52
wherein the first filtering time function is configured to ensure the voltage of the output signal of the at least one power device exceeds the first voltage reference level during a de-glitching time; and
wherein the second filtering time function is configured to ensure the voltage of the output signal of the at least one power device exceeds the second voltage reference level during a de-glitching time.

55. The power device fault detection circuit according to claim 52 wherein the first measurement device is configured to determine whether the output signal of the at least one power device is greater than the first voltage reference level implemented by the first fault detector.

56. The power device fault detection circuit according to claim 52 wherein the first measurement device is configured as a comparator configured to compare the output signal of the at least one power device and the first voltage reference level implemented by the first fault detector.

57. The power device fault detection circuit according to claim 52 wherein the first measurement device is configured to measure a voltage of the output signal of the at least one power device.

58. The power device fault detection circuit according to claim 52 wherein the first fault detector comprises the first filtering time function that is configured to require the output signal of the at least one power device to remain above the first voltage reference level during a first de-glitching time.

59. The power device fault detection circuit according to claim 52 wherein the second measurement device is configured measure a voltage of the output signal of the at least one power device.

60. The power device fault detection circuit according to claim 52 wherein the second measurement device is configured as a comparator configured to compare the output signal of the at least one power device and the second voltage reference level implemented by the second fault detector.

61. The power device fault detection circuit according to claim 52 wherein the second measurement device is configured to determine whether the output signal of the at least one power device is greater than the second voltage reference level implemented by the second fault detector.

62. The power device fault detection circuit according to claim 52 wherein the second fault detector comprises the second Leading Edge Blanking (LEB) configured to implement at least in part the second time period of the second fault detector.

63. The power device fault detection circuit according to claim 52 wherein the second fault detector comprises the second filtering time function configured to require the output signal of the at least one power device to remain above the second voltage reference level during a second de-glitching time to determine a second fault.

64. The power device fault detection circuit according to claim 52 wherein the first fault detector is configured to implement in part a blanking capacitor (CBLK).

65. The power device fault detection circuit according to claim 64 wherein the first fault detector is configured to implement the blanking capacitor (CBLK) to avoid entering a charging state.

66. The power device fault detection circuit according to claim 64 further comprising a transistor to disconnect the blanking capacitor (CBLK).

67. The power device fault detection circuit according to claim 64 wherein the first fault detector is further configured to determine whether a voltage on the output signal of the at least one power device is below the first voltage reference level and thereafter reconnect the blanking capacitor (CBLK).

68. The power device fault detection circuit according to claim 49 wherein the at least one power device comprises at least one of the following: a metal-oxide-semiconductor field-effect transistor (MOSFET), a silicon carbide (SiC) MOSFET, a Junction Field Effect Transistor (JFET), and a Bipolar Junction Transistor (BJT).

69. The power device fault detection circuit according to claim 49 wherein the at least one power device comprises a SiC MOSFET.

70. A system comprising the power device fault detection circuit according to claim 49, the system configured as one of the following: an inverter, a power system, a motor system, a converter, and an AC-DC power supply.

71. A system comprising the power device fault detection circuit according to claim 49, and the system further comprising a plurality of the at least one power device arranged in a power module.

* * * * *